United States Patent [19]

Lee et al.

[11] Patent Number: 5,294,695
[45] Date of Patent: Mar. 15, 1994

[54] PROCESS FOR PREPARING POLYETHYLENE NAPHTHALATE

[75] Inventors: Kwan-Kyung Lee; Byeong-Ho Cho; Yong-Won Kim, all of Suwon, Rep. of Korea

[73] Assignee: SKC Limited, Suwon, Rep. of Korea

[21] Appl. No.: 31,626

[22] Filed: Mar. 15, 1993

[51] Int. Cl.$^5$ ............................................. C08G 63/78
[52] U.S. Cl. ..................................... 528/279; 528/275; 528/280; 528/281; 528/282; 528/283; 528/284; 528/285; 528/298; 528/308; 528/485; 528/503
[58] Field of Search .............. 528/272, 275, 279, 280, 528/281, 282, 283, 284, 285, 298, 308, 485, 503

[56] References Cited

U.S. PATENT DOCUMENTS

| | | | |
|---|---|---|---|
| 4,066,624 | 1/1978 | Kawase et al. | 528/173 |
| 4,729,915 | 3/1988 | Sakamoto et al. | 428/141 |
| 4,804,736 | 2/1989 | Utsumi | 528/176 |

Primary Examiner—John Kight, III
Assistant Examiner—S. A. Acquah
Attorney, Agent, or Firm—William F. Pinsak

[57] ABSTRACT

The present invention relates to a process for preparing a polyethylene naphthalate possessed with high viscosity, characterized by sloving of various problems of the prior art by controlling the rate of the polycondensation reaction.

Particularly, the present invention provides a process for preparing polyethylene naphthalate from an esterification reaction product of naphtalene dicarboxylic acid or an alkyl ester thereof and a diol, which comprises polycondensing the esterification reaction product in the presence of a polycondensation catalyst in two steps wherein the first step is carried out at a pressure ranging from 500 to 30 torr and the second step is carried out at a pressure ranging from 10 to 0.1 torr with controlling the reaction rate such that the differential increase of the intrinsic viscosity of the resultant polymer can satisfy the following equations:

$$IV(t_1) - IV(t_0) < 0.4 \text{ dl/g} \quad (1)$$

$$IV(t_2) - IV(t_0) > 0.3 \text{ dl/g} \quad (2)$$

wherein: $IV(t_0)$ represents the intrinsic viscosity at the beginning of the second step polycondensation, $IV(t_1)$ represents the intrinsic viscosity at 90 minutes after the beginning of the second step polycondensation, and $IV(t_2)$ represents the intrinsic viscosity at 180 minutes after the beginning of the second step polycondensation.

4 Claims, No Drawings

PROCESS FOR PREPARING POLYETHYLENE NAPHTHALATE

FIELD OF THE INVENTION

The present invention relates to a process for the preparation of polyester, particularly polyethylene naphthalate possessed with the desired high viscosity.

BACKGROUND OF THE INVENTION

Polyethylene naphthalate, one of the polyesters that have been broadly used in the art, is possessed with excellent physical and chemical properties such as heat resistance, durability, chemical resistance, radiation resistance and electrical insulation capability as well as good mechanical properties such as tensile strength, elasticity and impact strength; and, therefore, has been used for preparing various articles including magnetic recording media, capacitors, wrapping materials, photographic film and other commercial applications.

Particularly, biaxially oriented film of polyethylene naphthalate is proved to provide better mechanical strength, heat stability and dimension stability than polyethylene terephthalate film which has been widely used as a base film in the magnetic recording medium. Owing to such advantageous properties, polyethylene naphthalate film is being used as a carrier for 8 mm tapes, type C VHS tapes and video tapes with longer recording time.

Further, polyethylene naphthalate can be effectively sterilized due to its superior heat resistance ($Tg=115°$ C.) and, due to its good gas-barrier property, may be used in manufacturing bottles and other packaging materials.

In order to prepare polyethylene naphthalate possessed with good mechanical strength and heat stability, it is required to have a high intrinsic viscosity, e.g., greater than 0.4 dl/g. However, should the intrinsic viscosity exceed 100,000 centipoise (at 295° C., shear 100 sec$^{-1}$), there may arise various problems including the overloading of the motor for stirring the reactants during the polycondensation or extrusion molding process, which may result in the introduction of undesirable "bubbles" into the product in addition to other handling and reaction control problems.

If the bubbles containing ethylene glycol, used as a starting material, and acetaldehyde, cyclic oligomers and water components, generated as reaction by-products, are introduced into the polymer product, it may significantly lower the intrinsic viscosity of the polymer, thereby deteriorating the mechanical, thermal and chemical properties of the film obtained therefrom.

To solve the above-mentioned problems, various attempts have been made. For instance, a process for removing the bubbles incorporated into the polymer by way of alternatively applying an elevated pressure and a reduced pressure in a reactor after the polycondensation process has been completed is described in Japanese Laid-open Patent Publication No. 260822/1987. However, this method tends to damage the polymer, if repeated.

Further, a process for removing such bubbles during the extrusion process by way of employing an extruder equipped with a ventilation funnel is known to those skilled in the art. However, deterioration of the polymer can still occur before such debubbling process is carried out.

SUMMARY OF THE INVENTION

The present inventors have discovered that by controlling the rate of increase in the intrinsic viscosity during the polycondensation process, introduction or generation of bubbles within the polymer product can be prevented and removal of the bubbles generated during the reaction process can be facilitated, thereby obviating or ameliorating the above-mentioned problems.

Accordingly, a primary object of the present invention is to provide a process for preparing polyethylene naphthalate from an esterification reaction product of naphthalene dicarboxylic acid or an alkyl ester thereof and a diol in two steps.

DETAILED DESCRIPTION OF THE INVENTION

The present invention provides a process for preparing polyethylene naphthalate from an esterification reaction product of naphtalene dicarboxylic acid or an alkyl ester thereof and a diol, which comprises polycondensing the esterification reaction product in the presence of a polycondensation catalyst in two steps wherein the first step is carried out at a pressure ranging from 500 to 30 torr for a period of 10 to 40 minutes and the second step is carried out at a pressure ranging from 10 to 0.1 torr for a period of 180 to 300 minutes.

If desired, the polycondensation reaction may be conducted in three or more steps under a higher vacuum.

The esterification reaction product may be obtained by esterifying dimethyl naphthalate or naphthalene dicarboxylic acid with a diol at a molar ratio of 1:2 in the presence of a catalyst, e.g., a catalytic compound containing such a metallic component as manganese, potassium, lithium, calcium, magnesium, zinc, aluminum or cadmium, under the conventional conditions known in the art. The esterification catalyst may be employed in an amount ranging from 0.005 to 1.0% by weight based on the weight of the naphthalenic reactant.

The esterification reaction product obtained by the above-mentioned procedure is then polycondensed in two steps. The first-step polycondensation is conducted by polycondensing the esterification reaction product in the presence of a polycondensation catalyst and a stabilizer, which have been introduced previously into the reaction zone before the introduction of the reaction product, at a temperature ranging from 270° to 300° C. and a pressure ranging from 500 to 30 torr.

The polycondensation catalyst contains a metallic component selected from the group consisting of antimony, lithium, germanium, cobalt, titanium, selenium, tin, zinc, aluminum, lead, iron, manganese, magnesium and calcium; and, employed in an amount ranging from 0.005 to 1% by weight based on the weight of the naphthalenic reactant.

Specific examples of the catalyst include: $CoCl_2.6H_2O$, $Ca(CH_3COO)_2.H_2O$, $Fe_2O_3$, $Mn(CH_3COO)_2.4H_2O$, $Se(CH_3COO)_3.H_2O$, $Zn(CH_3COO)_3.2H_2O$, $Mg(CH_3COO)_2.4H_2O$, $Co(CH_3COO)_2.4H_2O$, $TiO_2$, $CH_3COOLi.2H_2O$, $GeO_2$, $Ti(OC_4H_9)_4$, $Sn(CH_3COO)_2$, $PbO$, $Sb_2O_3$, $Sb_2(OCH_2CH_2O)_3$ and the like.

The stabilizer may be a phosphate, for example, trimethylene phosphate, etc.; and employed in an amount ranging from 0.005 to 2% by weight based on the weight of the naphthalenic reactant.

The first-step polycondensation is preferably carried out for a period ranging from 10 to 40 minutes, preferably from 20 to 30 minutes.

Subsequently, the firstly polycondensed product is then polycondensed second time in situ under a higher vacuum, for example, a pressure ranging from 10 to 0.1 torr while controlling the reaction rate in such a manner that the differential increase in the intrinsic viscosity of the polycondensation mixture can satisfy the following equations:

$$IV(t_1) - IV(t_0) < 0.4 \text{ dl/g} \quad (1)$$

$$IV(t_2) - IV(t_0) > 0.3 \text{ dl/g} \quad (2)$$

wherein: $IV(t_0)$ represents the intrinsic viscosity at the beginning of the second step polycondensation; $IV(t_1)$ represents the intrinsic viscosity at 90 minutes after the beginning of the second step polycondensation; and $IV(t_2)$ represents the intrinsic viscosity at 180 minutes after the beginning of the second step polycondensation.

If the difference of $IV(t_1)$ and $IV(t_0)$, i.e., the value of equation (1), is equal to or greater than 0.40 dl/g, the increase rate of the intrinsic viscosity is so fast that the bubbles generated cannot sufficiently escape from the polymer so that the resultant polymer may be deposited onto the stirrer as the reaction progresses to the extent that the termination point of the reaction cannot be determined; and, extrusion of the resultant polymer cannot be effectively carried out and, therefore, the yield becomes lower.

If the difference of $IV(t_2)$ and $IV(t_0)$, i.e., the value of equation (2), is equal to or smaller than 0.30 dl/g, the progress of the reaction is so slow that deterioration of the resultant polymer can occur due to side reactions; and, as a result, the polymer may turn yellowish, the reaction time becomes longer and the productivity gets lowered.

Preferably, the second step polycondensation is controlled in such a manner that the equations (1) and (2) be satisfied and, more preferably, the intrinsic viscosity of the polycondensation mixture lies within the range of 0.3 to 0.4 dl/g during the period between 100 and 150 minutes after the beginning of the second step polycondensation.

The second step polycondensation is preferably carried out for a period ranging from 180 to 300 minutes.

If a polymer possessed with a still higher intrinsic viscosity is desired, the above-mentioned polycondensation catalyst may be further introduced into the reactants when the intrinsic viscosity reaches the range of 0.3 to 0.4 dl/g in order to shorten the reaction time and to prevent the deterioration of the resultant polymer. One or more of the catalysts described above may be employed again in the second step (which may be the same or different as the catalyst used in the first step); and, employed in an amount ranging from 0.005 to 1% by weight of the naphthalenic reactant, which may vary depending on the lapse of the reaction time, the value of the intrinsic viscosity and the activity of the catalyst.

Representative examples of the naphthalene dicarboxylic acid useful in the present invention may include 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid and the like.

Representative examples of the alkyl ester of naphthalene dicarboxylic acid which may be used in the present invention include: dimethyl-1,2-naphthalate, dimethyl-1,5-naphthalate, dimethyl-1,6-naphthalate, dimethyl-1,7-naphthalate, dimethyl-1,8-naphthalate, dimethyl-2,3-naphthalate, dimethyl-2,6-naphthalate, dimethyl-2,7-naphthalate and the like.

In the present invention, at least one glycol selected from the group consisting of glycols having 2 to 12 carbon atoms can be employed as the diol component. Examples of such glycols may include: ethylene glycol, 1,2-propylene glycol, 1,3-propylene glycol, 2,2-dimethyl-1,3-propane diol, 2,2-dimethyl-1,3-propylene glycol, 1,3-butane diol, 1,4-butane diol, 1,5-penthane diol, 1,6-hexane diol, 1,3-cyclohexane dimethanol, 1,4-cyclohexane dimethanol and the like. Ethylene glycol is preferred for the purpose of the present invention.

Further, the intrinsic viscosity of polyethylene naphthalate is preferably within the range of 0.4 to 1.0 dl/g and, more preferably, 0.5 to 0.8 dl/g for the purpose of the present invention.

A biaxially oriented film of polyethylene naphthalate can be prepared by melt-extruding the polymer into the form of a sheet and then extending the sheet biaxially by using a conventional orientation method of a polyester resin known in the art. In order to impart the antitacky and other desirable properties to the film used as a magnetic recoding medium, an inorganic filler can be incorporated into the polymer during the preparation process of the film.

The inorganic filler may be employed alone or in combination with other fillers. Examples of such inorganic fillers may include: titanium dioxide, silicon dioxide, synthetic calcium carbonate, aluminum hydroxide, kaoline, talc, barium sulfate and the like, in the form of a non-active particle. The suitable amount of the inorganic filler may range from 0.001 to 2.0% by weight based on the total weight of the film forming composition; and the particle size of the filler may preferably range from 300 to 1000 nm. If the size is less than 300 nm, the antitacky property of the film may not be improved; and, if the size is greater than 1000 nm, the electromagnetic property of the magnetic tape employing the film may become deteriorated and damages to the tape may occur during the running of the tape.

The biaxially oriented film of polyethylene naphthalate may be prepared as follows: polyethylene naphthalate resin having an intrinsic viscosity of 0.4 to 1.0 dl/g is dried until the water content thereof reaches 0.1% by weight or less, melt-extruded by using an extruder at a temperature ranging from 275° to 300° C. and cast through the slit of a casting die to form a sheet; and, the sheet cast is solidified by quenching it over cooling rolls at 10° to 50° C., extended in a longitudinal direction at a draw ratio of 3.5 or more at a temperature ranging from Tg(glass transition temperature)+5° C. to 180° C. and then oriented in a lateral direction at a draw ratio of 3.5 or more at a temperature ranging from Tg+15° C. to 200° C. and heat-treated at a temperature ranging from 200° to 250° C. for a period of 2 to 10 seconds to provide a biaxially oriented polyester film. The biaxial orientation may be conducted by extending the sheet in said both directions simultaneously or stepwise.

The following Examples are intended to further illustrate the present invention more specifically, without limiting the scope of the invention.

In the Examples, samples of polyethylene naphthalate were evaluated in accordance with the following methods.

1. Intrinsic Viscosity (IV)

The IV's of the polyethylene naphthalate samples were measured at 35° C. with a sample concentration of 0.3 g per 25 ml of ortho-chlorophenol by using an IV Measurement Model No. BK-53 (product of YAMATO (Japan)).

2. Bubbling Rate

Amorphous chips having a weight of 0.02-0.2 g were prepared from the polyethylene naphthalate of the present invention and then the bubbles contained in the chips were observed by using a conventional microscope or visually. The bubbling rate of the samples was determined as a percetage of the number of polymer chips containing the bubbles therein per the number of polymer chips selected randomly.

3. Color Evaluation

The color of the chips prepared as described above was evaluated as Color-B (as the value of Color-B increases, the color becomes increasingly yellowish). The measurements were taken by irradiating a light (from a light source) to the chips and measuring its color difference from the reflected light, by using a Color Machine Sigma-80 (product of Nippon Denshoku (Japan)).

EXAMPLE 1

7,500 g of dimethyl-2,6-naphthalate was esterified with 3,815 g of ethylene glycol in the presence of 0.15% by weight of manganese acetate based on the weight of the naphthalenic reactant with slowly increasing the reaction temperature from 150° C. to 240° C. at an ambient pressure for 200 minutes. 30 minutes before the beginning of the polycondensation of the resulting esterified product, 0.08% by weight of antimony triethylene glycoxide and 0.12% by weight of trimethylene phosphate based on the weight of the naphthalenic reactant were introduced into a polycondensation reactor and dispersed with stirring. The esterified product was introduced into the reactor and polycondensed at 290° C. and 300 torr for 25 minutes. The firstly polycondensed product was polycondensed second time under 0.2 torr for 120 minutes to produce a polymer having the intrinsic viscosity of 0.35 dl/g. 0.06% by weight of antimony triethylene glycoxide was further introduced thereto as a catalyst to continue the polycondensation reaction, thereby to produce a polyethylene naphthalate resin having an intrinsic viscosity of 0.65 dl/g or greater.

The conditions of the polycondensation reaction and the properties of the resin produced are shown in the following Table 1.

EXAMPLE 2

As described in Example 1, an esterified product was obtained from dimethyl-2,6-naphthalate and ethylene glycol. 30 minutes before the beginning of the polycondensation, 0.07% by weight of antimony trioxide and 0.12% by weight of trimethylene phosphate were introduced into a polycondensation reactor and dispersed with stirring. The esterified product was introduced into the reactor and polycondensed at 285° C. and 300 torr for 25 minutes. The firstly polycondensed product was then polycondensed second time under 3 torr for 150 minutes to produce a polymer having the intrinsic viscosity of 0.32 dl/g. 0.06% by weight of antimony triethylene glycoxide was further introduced thereto to continue the polycondensa-tion reaction, thereby to produce a polyethylene naphthalate resin having an intrinsic viscosity of 0.65 dl/g or greater.

The condition of the polycondensation reaction and the properties of the resin produced are shown in the following Table 1.

EXAMPLE 3

As described in Example 1, an esterified product was obtained from dimethyl-2,6-naphthalate and ethylene glycol. 30 minutes before the beginning of the polycondensation, 0.05% by weight of germanium dioxide and 0.12% by weight of trimethylene phosphate were introduced into a polycondensation reactor and dispersed with stirring. The esterified product was introduced into the reactor and polycondensed at 295° C. and 300 torr for 25 minutes. The firstly polycondensed product was then polycondensed second time under 1 torr for 100 minutes to produce a polymer having the intrinsic viscosity of 0.35 dl/g. 0.06% by weight of antimony triethylene glycoxide was further introduced thereto to continue the polycondensation reaction, thereby to produce a polyethylene naphthalate resin having an intrinsic viscosity of 0.65 dl/g or greater.

The conditions of the polycondensation reaction and the properties of the resin produced are shown in the following Table 1.

EXAMPLE 4

As described in Example 1, an esterified product was obtained from dimethyl-2,6-naphthalate and ethylene glycol. 30 minutes before the beginning of the polycondensation, 0.05% by weight of cobalt acetate and 0.12% by weight of trimethylene phosphate were introduced into a polycondensation reactor and dispersed with stirring. The esterified product was introduced into the reactor and polycondensed at 285° C. and 300 torr for 25 minutes. The firstly polycondensed product was then polycondensed second time under 0.2 torr for 120 minutes to produce a polymer having the intrinsic viscosity of 0.35 dl/g. 0.05% by weight of cobalt acetate was further introduced thereto to continue the polycondensation reaction, thereby to produce a polyethylene naphthalate resin having an intrinsic viscosity of 0.65 dl/g or greater.

The conditions of the polycondensation reaction and the properties of the resin produced are shown in the following Table 1.

COMPARATIVE EXAMPLE 1

As described in Example 1, an esterified product was obtained from dimethyl-2,6-naphthalate and ethylene glycol. 30 minutes before the beginning of the polycondensation, 0.004% by weight of antimony trioxide and 0.12% by weight of trimethylene phosphate were introduced into a polycondensation reactor and dispersed with stirring. The esterified product was introduced into the reactor and polycondensed at 285° C. and 300 torr for 25 minutes. The firstly polycondensed product was then polycondensed again under 0.3 torr for 200 minutes to produce a polymer having the intrinsic viscosity of 0.38 dl/g. 0.07% by weight of antimony triethylene glycoxide was further introduced thereto to continue the polycondensation reaction, thereby to produce a polyethylene naphthalate resin having an intrinsic viscosity of 0.65 dl/g or greater.

The conditions of the polycondensation reaction and the properties of the resin produced are shown in the following Table 1.

COMPARATIVE EXAMPLE 2

As described in Example 1, an esterified product was obtained from dimethyl-2,6-naphthalate and ethylene glycol. 30 minutes before the beginning of the polycondensation, 0.23% by weight of germanium dioxide and 0.12% by weight of trimethylene phosphate were introduced into a polycondensation reactor and dispersed with stirring. The esterified product was introduced into the reactor and polycondensed at 295° C. and 300 torr for 25 minutes. The firstly polycondensed product was then polycondensed second time under 0.1 torr for 80 minutes to produce a polymer having the intrinsic viscosity of 0.45 dl/g. 0.06% by weight of antimony triethylene glycoxide was further introduced thereto to continue the polycondensation reaction of the reactants, thereby to produce a polyethylene naphthalate resin having an intrinsic viscosity of 0.65 dl/g or greater.

The conditions of the polycondensation reaction and the properties of the resin produced are shown in the following Table 1.

COMPARATIVE EXAMPLE 3

As described in Example 1, an esterified product was obtained from dimethyl-2,6-naphthalate and ethylene glycol. 30 minutes before the beginning of the polycondensation, 0.25% by weight of titanium dioxide and 0.12% by weight of trimethylene phosphate were introduced into a polycondensation reactor and dispersed with stirring. The esterified product was introduced into the reactor and polycondensed at 295° C. and 300 torr for 25 minutes. The firstly polycondensed product was then polycondensed again under 0.4 torr for 90 minutes. The polycondensation reaction of the reactants was continued without the addition of any catalyst to produce a polyethylene naphthalate resin having an intrinsic viscosity of 0.65 dl/g or greater.

The conditions of the polycondensation reaction and the properties of the resin produced are shown in the following Table 1.

As shown in Table 1, in accordance with the present invention, by controlling the rate of the polycondensation reaction, generation of bubbles within the polymer product is reduced; the bubbles generated during the reaction can be readily removed; and, therefore, the resultant polyethylene naphthalate possessed with a high viscosity and with a lower bubble content, while maintaining the color integrity, can be obtained in a higher yield.

While the invention has been described in connection with the above specific embodiments, it should be recognized that various modifications and changes as may be apparent to those skilled in the art to which the invention pertains may be made and also fall within the scope of the invention as defined by the claims that follow.

What is claimed is:

1. A process for preparing polyethylene naphthalate from an esterification reaction product of naphthalene di-carboxylic acid or an alkyl ester thereof and a diol, which comprises polycondensing the esterification reaction product in the presence of a polycondensation catalyst in two steps wherein the first step is carried out at a pressure ranging from 500 to 30 torr and the second step is carried out at a pressure ranging from 10 to 0.1 torr under a controlled differential increase in the intrinsic viscosity of said polycondensation reaction mixture to satisfy the inequality relationship of:

$$IV(t_1) - IV(t_0) < 0.4 \text{ dl/g and}$$

$$IV(t_2) - IV(t_0) > 0.3 \text{ dl/g}$$

wherein:
  $IV(t_0)$ represents the intrinsic viscosity at the beginning of the second step;
  $IV(t_1)$ represents the intrinsic viscosity at the 90th minute after the beginning of the second step; and
  $IV(t_2)$ represents the intrinsic viscosity at the 180th minute after the beginning of the second step; and wherein the intrinsic viscosity of said polycondensation reaction mixture during the second step lies within a range from 0.3 to 0.4 dl/g during a period between the 100th and the 150th minutes after the beginning of the second step.

2. The process of claim 1 wherein the polycondensation catalyst is further introduced during the second step polycondensation when the intrinsic viscosity reaches a range of 0.3 to 0.4 dl/g.

3. The process of claim 1 wherein the polycondensation catalyst contains a metalic component selected from the group consisting of antimony, lithium, germanium, cobalt, titanium, selenium, tin, zinc, aluminum, lead, iron, manganese, magnesium and calcium.

4. The process of claim 1 wherein the polyethylene naphthalate produced has an intrinsic viscosity ranging from 0.4 to 1.0 dl/g.

TABLE 1

|  | Time to be added the catalyst at second step (min.) | Reaction Time of second step (min.) | Intrinsic viscosity (dl/g) | Value of Color-B | Bubbling Rate (%) | Yield (%) |
|---|---|---|---|---|---|---|
| Example No. 1 | 120 | 200 | 0.66 | 5.97 | 15 | 82 |
| Example No. 2 | 150 | 220 | 0.68 | 6.31 | 17 | 83 |
| Example No. 3 | 100 | 190 | 0.67 | 6.2 | 16 | 85 |
| Example No. 4 | 120 | 210 | 0.65 | 6.3 | 21 | 84 |
| Comparative Example No. 1 | 200 | 300 | 0.65 | 18.4 | 13 | 83 |
| Comparative Example No. 2 | 80 | 130 | 0.70 | 5.7 | 97 | 65 |
| Comparative Example No. 3 | — | 140 | 0.69 | 7.6 | 95 | 64 |

UNITED STATES PATENT AND TRADEMARK OFFICE
CERTIFICATE OF CORRECTION

PATENT NO. : 5,294,695
DATED : March 15, 1994
INVENTOR(S) : Kwan-Hyung Lee et al It is certified that error appears in the above-indentified patent and that said Letters Patent is hereby corrected as shown below:

Title page, item [75], the name of the first inventor should read

--Kwan-Hyung Lee --.

Signed and Sealed this

Seventh Day of March, 1995

Attest:

BRUCE LEHMAN

Attesting Officer  Commissioner of Patents and Trademarks